United States Patent
Clem, II

[15] 3,704,899
[45] Dec. 5, 1972

[54] BICYCLE SIDE CAR

[72] Inventor: Eldred L. Clem, II, 174 Westwood Road, Columbus, Ohio 43214

[22] Filed: July 23, 1970

[21] Appl. No.: 57,483

[52] U.S. Cl. ............................... 280/203, 296/31
[51] Int. Cl. ........................................ B62k 27/04
[58] Field of Search ............... 280/203, 281; 296/31

[56] References Cited

UNITED STATES PATENTS

| | | | |
|---|---|---|---|
| 2,822,879 | 2/1958 | Overton | 280/203 X |
| 3,415,539 | 12/1968 | Stevens | 280/203 |
| 3,023,045 | 2/1962 | Cirami | 296/31 |
| 3,498,633 | 3/1970 | Hopkins | 280/203 X |
| 3,135,640 | 6/1964 | Kepka et al. | 296/31 X |
| 2,865,656 | 12/1958 | Musgrave | 280/203 |

Primary Examiner—Kenneth H. Betts
Attorney—Jerome R. Cox

[57] ABSTRACT

A side car for a bicycle. This side car is supported by a frame that mounts to the frame of a bicycle and not to the bicycle axle, thus because the frame of the side car is hinged to the mounting frame which is attached to the bicycle, the bicycle can tilt independently of the side car. The axle does not extend through the side car. The outer wheel of the side car is supported on a stub axle secured only to the outer part of the side car frame. The moulded body of the side car is supported by the frame. Moulded integrally with the side car is a fender for the side car wheel. The side car when constructed of a fiber glass layup is moulded in two parts; the lower part, including the fender for the side car wheel, has an opening through the bottom and back of the seat portion thereof, and a separately moulded seat fits snugly into and covers the opening in the main portion of the side car. In the vacuform moulding process, a single unitary piece of moulded material forms the entire side car including the seat.

3 Claims, 5 Drawing Figures

PATENTED DEC 5 1972

INVENTOR.
ELDRED L. CLEM II
BY
Jerome A. Cox
ATTORNEY

PATENTED DEC 5 1972

INVENTOR.
ELDRED L. CLEM II

BY

*Jerome R. Cox*

ATTORNEY

BICYCLE SIDE CAR

BACKGROUND OF THE INVENTION

My invention relates to a side car for a bicycle, the side car being made of moulded plastic (e.g. fiber glass, acrylics, and/or other plastics reinforced with fiber glass) and being supported by side car frame hinged to a mounting frame attached to the frame of the bicycle. The side car frame is supported at its outer side by a side car wheel which is mounted on a stub axle secured to the side car frame. The side car wheel rotates in a pocket formed in a fender moulded as a part of the main side car body.

Side cars for bicycles have previously been designed, used, and patented. Some of the features of my invention have been shown independently in some of the prior art patents related to side cars, as for example, U.S. Pats. to Cretors No. 592,963, Johnson No. 1,069,788, Rogers No. 1,140,069, Rogers No. 1,247,333 and Musgrave No. 2,865,656. None of these patents, nor any other patents of which we know, discloses all of the features of my invention.

There is a need for a side car for a bicycle which is simple in design, economical to manufacture, safe in operation, easily attached to and removed from a bicycle, and including the features listed above.

It is therefore an object of my invention to provide an improved side car for bicycles.

Another object of my invention is to provide a side car for a bicycle which is not only mechanically simple, inexpensive, and reliable but can be easily attached to and detached from a bicycle, is safe in operation, and is economical to manufacture and distribute.

SUMMARY OF THE INVENTION

I have found that the foregoing and other objects may be attained by providing a side car which consists of three or four main parts; namely, (1) a side car frame; (2) a main side car body resting upon the frame; (3) a stub axle on which a side car wheel is mounted and which is secured to the side car frame; and (4) a seat for the side car having an open front and resting upon the main side car body and covering a hole formed through the main side car body and secured to the main side car body. Thus there are four main parts when the structure is moulded by fiber glass layup. When produced by vacuform process, the main side car body and the seat are combined and the separate seat portion is eliminated, and thus there are only three main parts.

More specifically, I have found that these objects may be attained by providing a side car for a bicycle which consists of the following six parts: a mounting frame which is secured to the frame of the bicycle; a side car frame secured by hinges to the mounting frame so that the side car frame may be pivoted about a horizontal axis extending substantially parallel to and adjacent to the frame of the bicycle; a side car supporting wheel carried by the side car frame; a main side car body resting upon the side car frame; and a stub axle on which the side car supporting wheel is mounted and which is secured to the side car frame.

Figure 1:
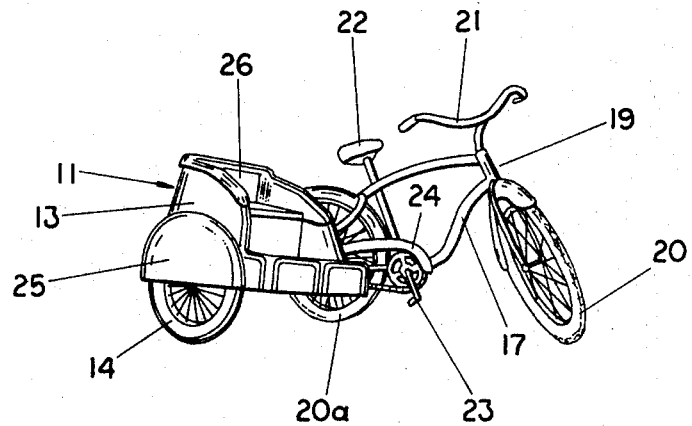
FIG. 1 is a view in perspective of a bicycle having the side car constructed according to my invention secured thereto.

In describing the preferred embodiment of the invention illustrated in the drawings, specific terminology will be resorted to for the sake of clarity. However, it is not intended to limit the invention to the specific terms so selected, and it is to be understood that each specific term includes all technical equivalents which operate in a similar manner to accomplish a similar purpose.

DETAILED DESCRIPTION

Figure 5:
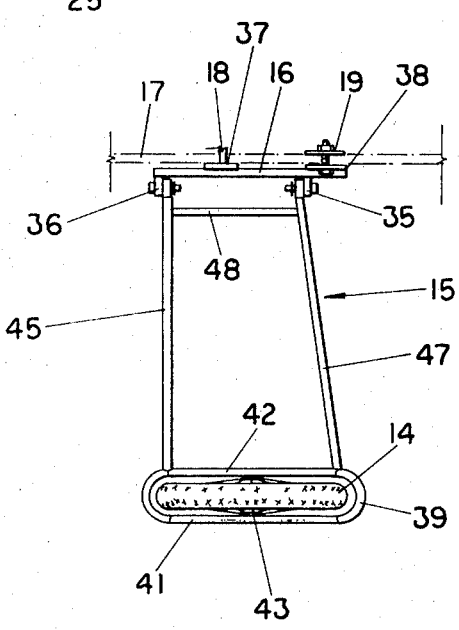
FIG. 5 is a view in plan of the frame shown attached by hinges to the frame of the bicycle, showing the tire for the side car wheel positioned in an elongated elipse portion of the frame.

FIGS. 1-5, inclusive, illustrate a side car constructed according to my invention. In FIG. 1, the side car is shown attached to a bicycle. Therein is shown a side car generally designated 11 including a main body portion 13 formed of fiber glass. Also is shown a supporting wheel 14 which is attached to a supporting frame 15 (FIG. 5). The supporting frame 15 is shown in FIG. 5. A mounting rod 16 is secured to the frame 17 of a bicycle 19. As seen in FIG. 1, the bicycle has ground wheels 20 and 20a, handle bars 21, a seat 22, driving sprocket wheel 23 and a chain guard 24.

The part 16 is a rod which is secured at two points to the bicycle frame 17. At one point 37, the rod 16 is provided with an apertured lug into which the axle 18 of the bicycle rear wheel 20a extends. At 38, there is a clamp which is secured to rod 16 and to bicycle frame 17. Its function will be explained more fully later in connection with FIG. 5.

The supporting frame 15 extends under and supports the side car body 13.

Figure 2:
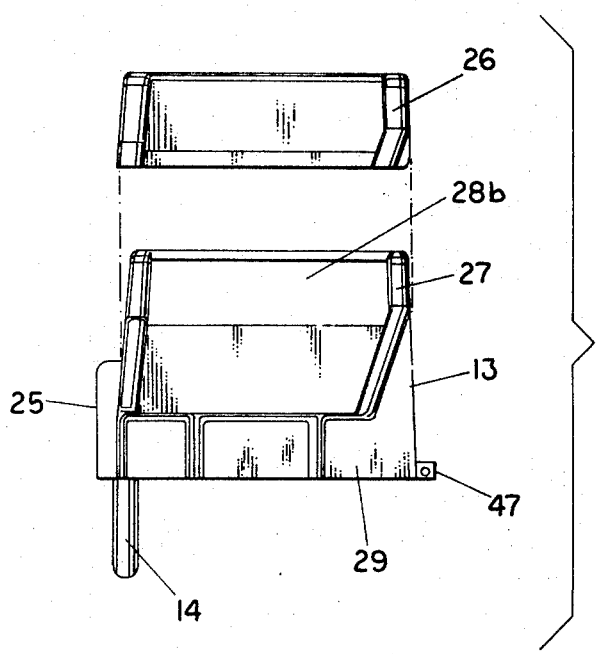
FIG. 2 is an exploded view of the side car showing in the lower part of that view the main body of the side car, showing a portion of the supporting wheel which extends into the well of such main body, and showing in the upper part a seat portion, shown removed, but which normally telescopes into and complements the main body portion.
Figure 3:
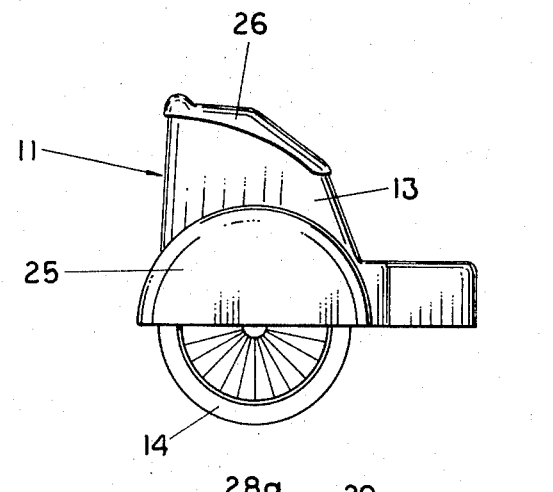
FIG. 3 is a side view of the main body of the side car shown in FIG. 1.
Figure 4:
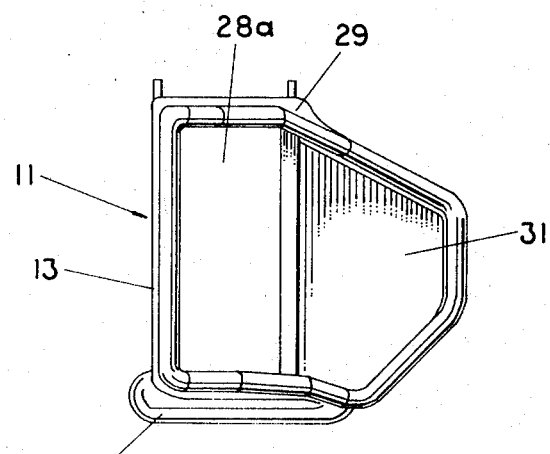
FIG. 4 is a plan view of the side car shown in FIGS. 1-3, inclusive.

In the exploded view of FIG. 2, it may be seen that the main body portion 13 of the side car 11 is provided with a fender 25 moulded as a portion of the body portion 13. The body portion 13 thus has a well into which the wheel 14 extends. The seat portion 26 telescopes over the upper part 27 of the body portion 13 and is securely fastened thereto.

For the purpose of lightening the body and providing better access to the interior thereof, an opening is provided in the main body portion. This opening extends vertically downwardly through the seat portion of the main body as at 28a in FIG. 4. Also it continues upward through the back of the seat as at 28b in FIG. 2. The telescoping of the portion 26 over part 27 secures the seat portion 26 securely to the body portion 13. Both the body portion 13 and the seat portion 26 are open in front for easy access by children to get into the car and onto the seat. The lower portion of the body portion 13 extends forward as at 29 and is formed with a platform 31 for resting the feet of the occupant or occupants of the side car.

The supporting frame 15 which forms an important part of the side car constructed according to my invention is shown in FIG. 5. It is pivoted on hinges 35 and 36 attached to the rod 16. The rod 16 is secured at 37 and 38 to the frame 17 of the bicycle as described above. Portions of the bicycle frame 17 and the larger part of the bicycle are broken away in FIG. 5 for clarity. The outer portion of the frame, designated 39, is an elongated ellipse which is shaped somewhat like a race track with the sides 41 and 42 substantially parallel with each other. Between these two parallel portions, a stub axle 43 is inserted in slots formed in plates welded to the sides 41 and 42. The wheel 14 rotates on the stub axle 43. The well of the main body portion 13 is formed by the fender 25 and is designed to cover and embrace the elongated elliptical part of the portion 39 of the frame 15. This secures and positions the side car body portion 13 safely upon the frame 15. In addition, the body portion 13 is plasticized to the frame by fiber glass at the elongated elliptical part 39 and at the cross bar 48.

ALTERNATIVE EMBODIMENT

In another embodiment of my invention, the main body 13 is formed integrally with the seat portion 26. This is accomplished by forming the whole plastic body by a vacuform molding process. Thus, a single unitary piece of moulded material forms the entire side car including the seat.

ASSEMBLY AND OPERATION

To assemble the structure, the rod 16 is first secured to the bicycle frame 17 and to the axle of the bicycle rear ground wheel 20a at 37 and 38 as previously described. The wheel 14 is placed in the elongated ellipse 39 and the stub axle 43, which is extended through the wheel 14, is placed in slots formed in plates welded respectively to sides 41 and 42 of the elongated ellipse 39. The wheel 14 is thus secured.

If the main body portion 13 is formed separately from the seat portion 25, such portion 13 is telescoped over the elongated ellipse 39 and is bonded to the frame by liquid plasticized fiber glass at all points of contact with said ellipse. It is also similarly plasticized to the cross bar 48. The main body 13 thus rests upon the elongated ellipse 39 and upon the legs 45 and 47 and upon the cross bar 48 of the frame. The seat 25 is telescoped over or into the outlines of the main body 13.

If, on the other hand, the main body portion is formed integrally with the seat portion, the unitary body as a whole is telescoped over the elongated ellipse and bonded to the frame as described in the last paragraph above.

In either event, the car is ready for operation.

The operation of the side car is obvious. The bicycle rider operates the bicycle in the usual manner and the passenger rides on the seat of the side car.

It is to be understood that while the detailed drawings and specific examples given describe preferred embodiments of my invention, they are for the purposes of illustration only, that the apparatus of the invention is not limited to the precise details and conditions disclosed, and that various changes may be made therein without departing from the spirit of the invention which is defined by the following claims.

I claim:

1. A side car for a bicycle having a frame comprising in combination:
    a mounting frame which is secured to the frame of the bicycle;
    a side car frame secured by hinges to the mounting frame so that the side car frame may be pivoted about a horizontal axis extending substantially parallel to and adjacent to the frame of the bicycle;
    a side car supporting wheel carried by the side car frame; and
    a stub axle on which the side car supporting wheel is mounted and which is secured to the side car frame, in which
    the main side car body has an opening formed therein which extends vertically downward through the seat portion of the main body and continues upward through the back of the seat, and has a fender with a well for the sidecar wheel; and
    there is provided a seat for the sidecar having an open front and resting upon the main sidecar body and covering the opening formed therein.

2. The structure of claim 1, in which the main side car body is formed as a single unitary piece of moulded material including the seat.

3. The structure of claim 1, in which the main side car body is formed of fiber glass bonded to the side car frame by plasticized fiber glass.

* * * * *